United States Patent [19]

Minor

[11] Patent Number: 5,538,658

[45] Date of Patent: Jul. 23, 1996

[54] REFRIGERANT COMPOSITIONS INCLUDING PENTAFLUORODIMETHYL ETHER

[75] Inventor: Barbara H. Minor, Elkton, Md.

[73] Assignee: E. I. Du Pont de Nemours and Company, Wilmington, Del.

[21] Appl. No.: 187,575

[22] Filed: Jan. 27, 1994

Related U.S. Application Data

[63] Continuation-in-part of Ser. No. 66,732, May 27, 1993, abandoned, which is a continuation-in-part of Ser. No. 920,692, Jul. 28, 1992, abandoned.

[51] Int. Cl.$^6$ ........................................... C09K 5/04
[52] U.S. Cl. ............................ 252/67; 62/114; 252/305; 510/411
[58] Field of Search ........................... 252/67, 171, 305, 252/DIG. 9; 62/114

[56] References Cited

U.S. PATENT DOCUMENTS

| 3,362,180 | 1/1968 | Eiseman | 62/112 |
| 3,922,228 | 11/1975 | Hutchinson | 252/67 |
| 4,948,526 | 8/1990 | Fellows et al. | 252/69 |

FOREIGN PATENT DOCUMENTS

| 416777 | 3/1991 | European Pat. Off. . |
| 3-93883 | 4/1991 | Japan . |
| 3-093889 | 4/1991 | Japan . |
| 4-110384 | 4/1992 | Japan . |
| 2247462 | 3/1992 | United Kingdom . |
| 93/11201 | 6/1993 | WIPO . |

OTHER PUBLICATIONS

*Research Disclosure*, vol. 146, Disclosure No. 14623 Jun. 1976.

Kazachki et al, *Proceedings of the 1992 International Refrigeration Conference*—Energy Efficiency and New Refrigerants vol. II Jul. 14–17, 1992 pp. 595–605.

Goge et al, *Proceedings of the 1992 International Refrigeration Conference*, Energy Efficiency and New Refrigerants vol. II Jul. 14–17, 1992 pp. 611–619.

*Primary Examiner*—Linda Skaling Therkorn

[57] ABSTRACT

Refrigerant compositions include mixtures of pentafluorodimethyl ether and a second component, wherein the second component is ammonia, dimethyl ether, cyclopropane, propane or propylene.

The invention also relates to azeotropic or azeotrope-like composition which comprise admixtures of effective amounts of pentafluorodimethyl ether and ammonia, dimethyl ether, cyclopropane, propane or propylene.

12 Claims, 3 Drawing Sheets

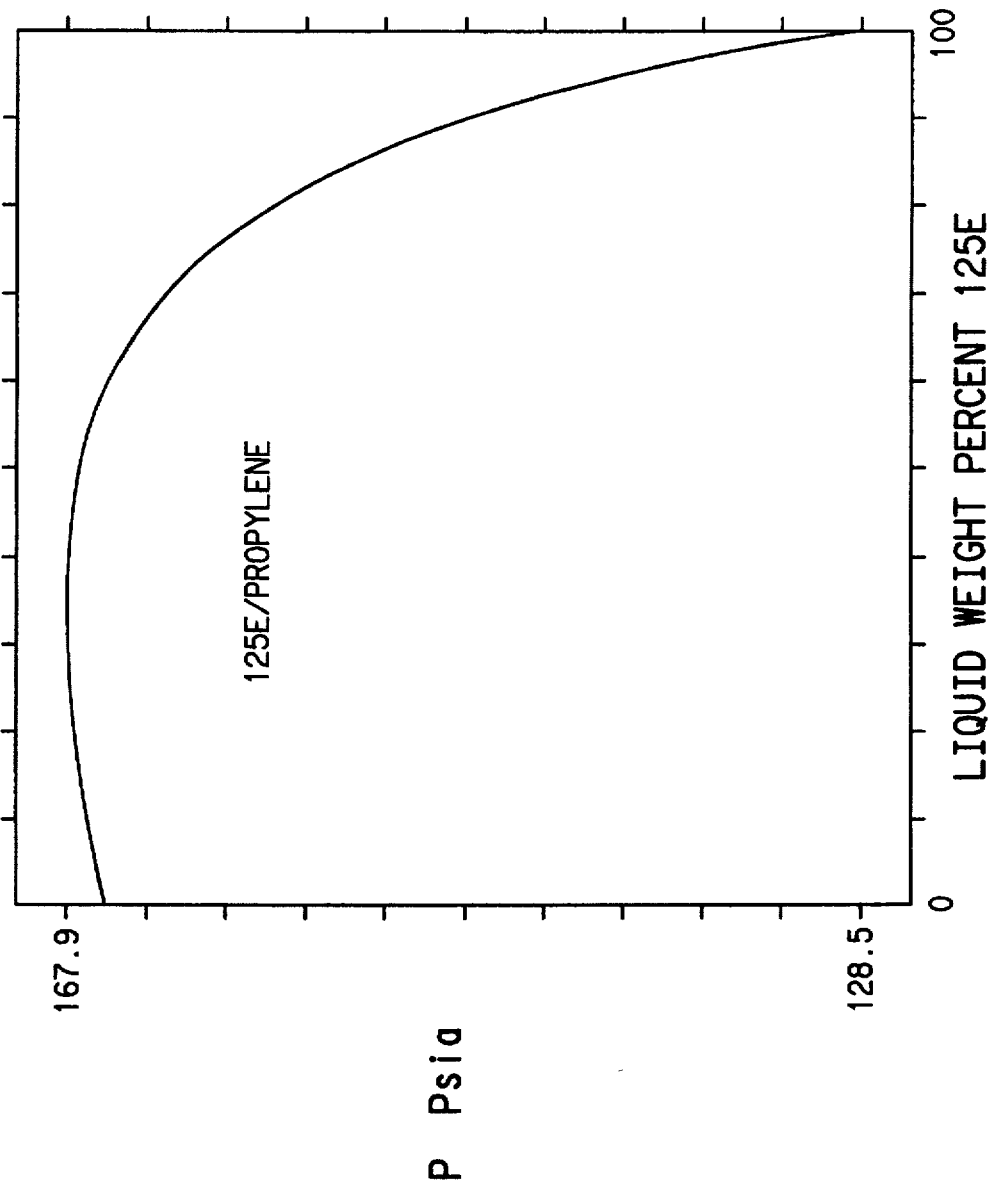

REFRIGERANT COMPOSITIONS INCLUDING PENTAFLUORODIMETHYL ETHER

CROSS-REFERENCE TO EARLIER FILED APPLICATIONS

This application is a continuation-in-part of application Ser. No. 08/066,732, filed May 27, 1993, now abandoned, which is a continuation-in-part of application Ser. No. 07/920,692, filed Jul. 28, 1992, now abandoned.

FIELD OF THE INVENTION

This invention relates to refrigerant compositions that include pentafluorodimethyl ether as a component. This invention also relates to binary azeotropic or azeotrope-like compositions that include pentafluorodimethyl ether, said compositions being useful as cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include dichlorodifluoromethane (CFC-12) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) have been suggested as replacements for CFCs and HCFCs since HFCs have no chlorine and therefore have zero ozone depletion potential.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which cause the refrigerant to become flammable or to have poor refrigeration performance.

Accordingly, it is desirable to use as a refrigerant a single fluorinated hydrocarbon ether or an azeotropic or azeotrope-like composition that includes one or more fluorinated hydrocarbon ether.

Fluorinated hydrocarbon ether may also be used as a cleaning agent or solvent to clean, for example, electronic circuit boards. It is desirable that the cleaning agents be azeotropic or azeotrope-like because in vapor degreasing operations the cleaning agent is generally redistilled and reused for final rinse cleaning.

Azeotropic or azeotrope-like compositions that include a fluorinated hydrocarbon ether are also useful as blowing agents in the manufacture of closed-cell polyurethane, phenolic and thermoplastic foams, as propellants in aerosols, as heat transfer media, gaseous dielectrics, fire extinguishing agents, power cycle working fluids, such as for heat pumps, inert media for polymerization reactions, fluids for removing particulates from metal surfaces, as carrier fluids that may be used, for example, to place a fine film of lubricant on metal parts, or as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, and as strippers for photoresists when used with, for example, a chlorohydrocarbon such as 1,1,1-trichloroethane or trichloroethylene.

SUMMARY OF THE INVENTION

The present invention relates to the discovery of refrigerant compositions of pentafluorodimethyl ether and a second component, wherein the second component is ammonia, dimethyl ether, cyclopropane, propane or propylene.

The invention also relates to azeotropic or azeotrope-like composition which comprise admixtures of effective amounts of pentafluorodimethyl ether and ammonia, dimethyl ether, cyclopropane, propane or propylene.

The compositions of the invention are also useful as cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BRIEF DESCRIPTION OF THE DRAWINGS

FIG. 3 is a graph of the vapor pressure of liquid mixtures of 125E and propylene at 25° C.

DETAILED DESCRIPTION

Figure 1:
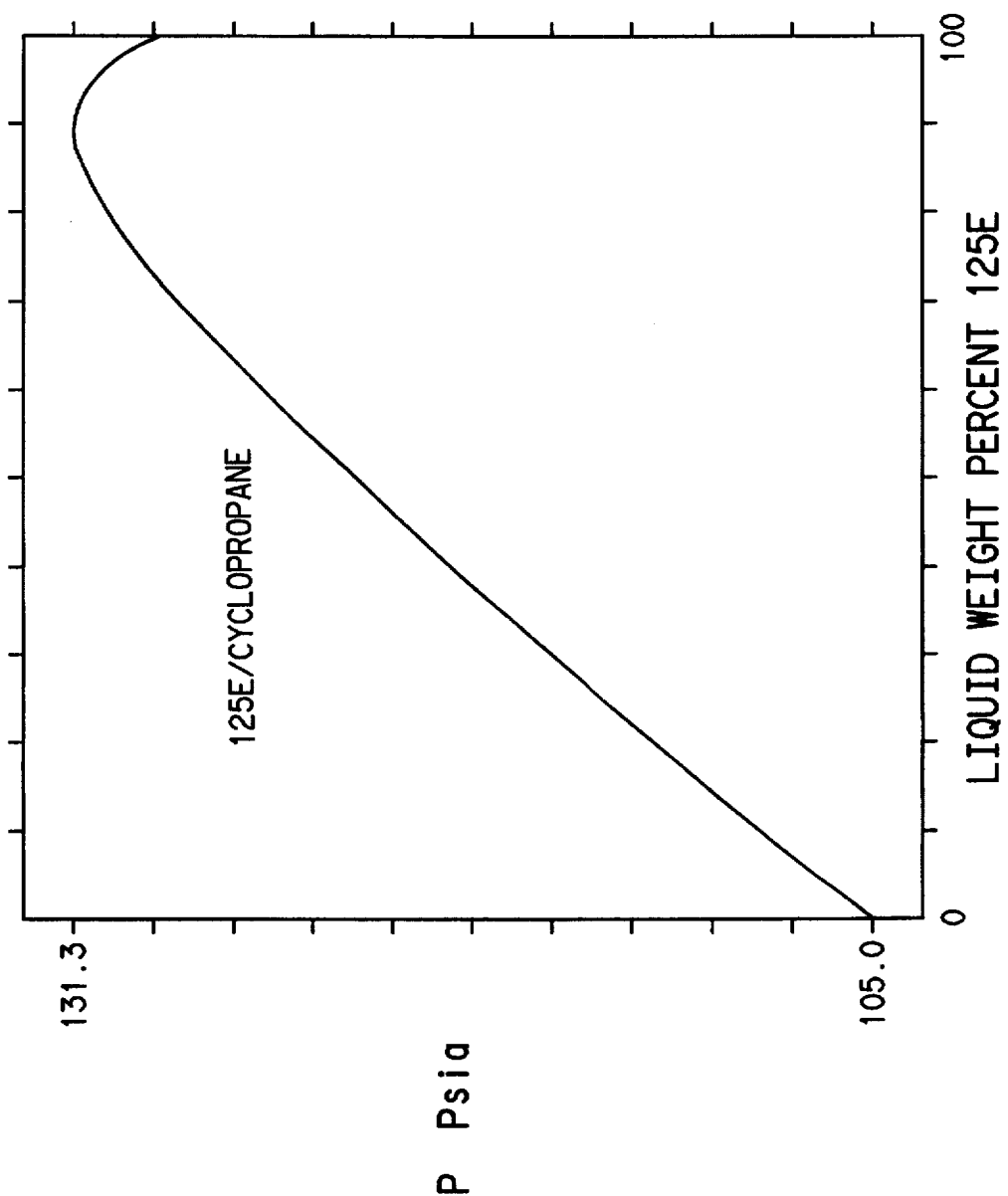
FIG. 1 is a graph of the vapor pressure of liquid mixtures of 125E and cyclopropane at 25° C.

The present invention relates to compositions of pentafluorodimethyl ether (125E), boiling point = −36.2° C., and at least one of the following components: ammonia ($NH_3$), dimethyl ether (DME), cyclopropane, propane or propylene.

The following compositions can be used as refrigerants.

TABLE 1

| Composition No. | | |
|---|---|---|
| 1 | 1–99 wt % 125E | 1–99 wt % $NH_3$ |
| 2 | 1–99 wt % 125E | 1–99 wt % DME |
| 3 | 1–99 wt % 125E | 1–99 wt % cyclopropane |
| 4 | 1–99 wt % 125E | 1–99 wt % propane |
| 5 | 1–99 wt % 125E | 1–99 wt % propylene |

The present invention also relates to the discovery of azeotropic or azeotrope-like compositions of effective amounts of 125E and a second component to form an azeotropic or azeotrope-like composition, wherein the second component is $NH_3$, DME, cyclopropane, propane or propylene.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distilis/refluxes without compositional change. Constant boiling compositions are characterized as azeotropic because they exhibit either a maximum or minimum boiling point at a particular pressure, and either a maximum or minimum vapor pressure at a particular temperature, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distilis/refluxes without substantial composition change.

It is recognized in the art that a composition is azeotropic or azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art.

Therefore, included in this invention are compositions of effective amounts of 125E and a second component, wherein the second component is $NH_3$, DME, cyclopropane, propane or propylene such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope that, for a maximum boiling azeotrope, have boiling points at a particular pressure higher than the pure components of the composition at that pressure and have vapor pressures lower at a particular temperature than the pure components of the composition at that temperature, and that, for a minimum boiling azeotrope, have boiling points at a particular pressure lower than the pure components of the composition at that pressure and have vapor pressures higher at a particular temperature than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that are substantially constant boiling. In those cases where the range of compositions that have maximum or minimum boiling temperatures at a particular pressure, or maximum or minimum vapor pressures at a particular temperature, are broader than the range of compositions that are substantially constant boiling according to the change in vapor pressure of the composition when 50 weight percent is evaporated, the unexpected intermolecular forces are nonetheless believed important in that the refrigerant compositions having those forces that are not substantially constant boiling may exhibit unexpected increases in the capacity or efficiency versus the components of the refrigerant composition.

The components of the compositions of this invention have the following vapor pressures at 25° C.

| COMPONENTS | PSIA | KPA |
|---|---|---|
| 125E | 128.5 | 886 |
| $NH_3$ | 142.6 | 983 |
| cyclopropane | 105.0 | 724 |
| propane | 137.8 | 950 |
| propylene | 165.9 | 1144 |

Substantially constant boiling, azeotropic or azeotrope-like compositions of this invention comprise the following (except where indicated, all compositions are measured at 25° C.):

1. 72–95, preferably 88 wt % 125E; 5–28, preferably 12 wt % $NH_3$.

2. 50–99, preferably 70–99, most preferably 83.0 wt % 125E; 1–50, preferably 1–30, most preferably 17.0 wt % DME.

3. 1–99, preferably 50–99, most preferably 89.3 wt % 125E; 1–99, preferably 1–50, most preferably 10.7 wt % cyclopropane.

4. 41–90, preferably 50–90, most preferably 71.3 wt % 125E; 10–59, preferably 10–50, most preferably 28.7 wt % propane.

5. 1–99, preferably 1–50, most preferably 33.8 wt % 125E; 1–99, preferably 50–99, most preferably 66.2 wt % propylene.

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective mounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of & B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Phase Study.

A phase study on the following compositions, wherein the composition is varied and the vapor pressures is measured, at a constant temperature of 25° C., shows that the following compositions are azeotropic.

| Composition No. | | | Vapor Pressure psia (kPa) |
|---|---|---|---|
| 1 | 88.0 wt % 125E | 12.0 wt % NH₃ | 265.5 (1831) |
| 2 | 83.0 wt % 125E | 17.0 wt % DME | 143.6 (990) |
| 3 | 89.3 wt % 125E | 10.7 wt % cyclopropane | 131.3 (905) |
| 4 | 71.3 wt % 125E | 28.7 wt % propane | 191.4 (1320) |
| 5 | 33.8 wt % 125E | 66.2 wt % propylene | 167.9 (1158) |

EXAMPLE 2

Impact of Vapor Leakage on Vapor Pressure at 25° C.

A vessel is charged with an initial composition at 25° C., and the vapor pressure of the composition is measured. The composition is allowed to leak from the vessel, while the temperature is held constant at 25° C., until 50 weight percent of the initial composition has been removed, at which time the vapor pressure of the composition remaining in the vessel is measured. The results are summarized below.

| Refrigerant Composition | 0 wt % evaporated psia (kPa) | 50 wt % evaporated psia (kPa) | 0% change in vapor pressure |
|---|---|---|---|
| 125E/NH₃ | | | |
| 72.0/28.0 | 265.4 (1830) | 263.5 (1817) | 0.7 |
| 88.0/12.0 | 265.5 (1831) | 265.5 (1831) | 0.0 |
| 95.0/5.0 | 265.2 (1829) | 252.9 (1744) | 4.6 |
| 25E/DME | | | |
| 50.0/50.0 | 134.3 (926) | 121.1 (835) | 9.8 |
| 60.0/40.0 | 138.2 (953) | 132.1 (911) | 4.4 |
| 70.0/30.0 | 141.4 (975) | 139.3 (960) | 1.5 |
| 83.0/17.0 | 143.6 (990) | 143.6 (990) | 0.0 |
| 99.0/1.0 | 131.1 (904) | 130.2 (898) | 0.7 |
| 125E/Cyclopropane | | | |
| 1.0/99.0 | 105.4 (727) | 105.2 (725) | 0.2 |
| 50.0/50.0 | 122.2 (853) | 119.4 (834) | 2.3 |
| 70.0/30.0 | 128.0 (894) | 127.0 (887) | 0.8 |
| 89.3/10.7 | 131.3 (905) | 131.3 (905) | 0.0 |
| 99.0/1.0 | 129.1 (890) | 129.1 (890) | 0.0 |
| 125E/Propane | | | |
| 40.0/60.0 | 182.9 (1261) | 164.5 (1134) | 10.1 |
| 41.0/59.0 | 183.5 (1265) | 166.1 (1145) | 9.5 |
| 50.0/50.0 | 187.4 (1292) | 178.8 (1233) | 4.6 |
| 71.3/28.7 | 191.4 (1320) | 191.4 (1320) | 0.0 |
| 90.0/10.0 | 181.4 (1251) | 164.9 (1137) | 9.1 |
| 91.0/9.0 | 179.4 (1237) | 160.7 (1108) | 10.4 |
| 125E/Propylene | | | |
| 1.0/99.0 | 166.0 (1159) | 166.0 (1159) | 0.0 |
| 33.8/66.2 | 167.9 (1158) | 167.9 (1158) | 0.0 |
| 50.0/50.0 | 167.2 (1168) | 167.0 (1166) | 0.1 |
| 70.0/30.0 | 162.8 (1137) | 161.3 (1127) | 0.9 |
| 99.0/1.0 | 131.1 (916) | 130.2 (909) | 0.7 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMPLE 3

Impact of Vapor Leakage on Vapor Pressure at −17.8° C.

A leak test is performed on compositions of 125E and propane as in Example 3, but at a temperature of −17.8° C. The results are summarized below.

| 125E/Propane | | | |
|---|---|---|---|
| 68.1/31.9 | 52.4 (361) | 52.4 (361) | 0.0 |
| 87.0/13.0 | 50.5 (348) | 45.8 (316) | 9.3 |
| 88.0/12.0 | 50.1 (345) | 44.5 (307) | 11.2 |
| 39.0/61.0 | 50.7 (350) | 45.7 (315) | 9.9 |
| 38.0/62.0 | 50.6 (349) | 45.2 (312) | 10.7 |

The results of this Example show that these compositions are azeotropic or azeotrope-like because when 50 wt. % of an original composition is removed, the vapor pressure of the remaining composition is within about 10% of the vapor pressure of the original composition, at a temperature of −17.8° C.

EXAMPLE 4

Refrigerant Performance

The following table shows the performance of the inventive refrigerants. The data are based on the following conditions.

Evaporator temperature 45.0° F. (7.2° C.)
Condenser temperature 130.0° F. (54.4° C.)
Subcool temperature 15.0° F. (8.3° C.)
Return gas temperature 65.0° F. (18.3° C.)
Compressor efficiency is 75%.

| Refrig. Comp. | Evap. Press. Psia (kPa) | Cond. Press. Psia (kPa) | Comp. Dis. Temp, °F. (°C.) | COP | Capacity BTU/min (kw) |
|---|---|---|---|---|---|
| HCFC-22 | 90.6 | 312.6 | 212.8 | 3.41 | 351.3 (6.2) |
| 125E/NH$_3$ | | | | | |
| 5.0/95.0 | 86.7 | 340.1 | 315.3 | 3.71 | 443.5 (7.8) |
| 88.0/12.0 | 119.5 | 427.3 | 215.4 | 3.33 | 466.1 (8.2) |
| 95.0/5.0 | 102.0 | 360.8 | 173.0 | 3.06 | 339.8 (6.0) |
| 125E/DME | | | | | |
| 5.0/95.0 | 49.9 | 186.5 | 192.1 | 3.67 | 219.3 (3.9) |
| 83.0/17.0 | 78.8 | 280.7 | 168.7 | 3.20 | 275.6 (4.8) |
| 99.0/1.0 | 78.6 | 286.4 | 162.1 | 3.03 | 258.7 (4.6) |
| 125E/Cyclopropane | | | | | |
| 1.0/99.0 | 62.7 | 215.6 | 200.4 | 3.66 | 259.6 (4.6) |
| 89.3/10.7 | 81.3 | 287.6 | 167.9 | 3.16 | 278.2 (4.9) |
| 99.0/1.0 | 78.6 | 286.2 | 162.3 | 3.03 | 259.2 (4.6) |
| 125E/Propane* | | | | | |
| 1.0/99.0 | 84.4 (582) | 242.3 (1671) | 154.6 (68.1) | 3.94 | 304.0 (5.4) |
| 71.3/28.7 | 116.5 (803) | 329.7 (2273) | 152.1 (66.7) | 3.24 | 330.4 (5.8) |
| 99.0/1.0 | 81.3 (561) | 258.2 (1780) | 150.8 (66.0) | 3.68 | 292.0 (5.1) |
| 125E/Propylene | | | | | |
| 1.0/99.0 | 104.3 | 332.0 | 183.8 | 3.31 | 351.7 (6.2) |
| 33.8/66.2 | 100.6 | 327.6 | 180.2 | 3.25 | 337.3 (5.9) |
| 99.0/1.0 | 78.8 | 287.1 | 162.3 | 3.02 | 259.0 (4.6) |

*condenser T = 120° F. (48.9° C.)

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

In addition to refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

EXAMPLE 5

This Example is directed to the vapor pressure of certain liquid mixtures of this invention. The vapor pressures for liquid mixtures of 125E and cyclopropane at 25° C. are shown in FIG. 1, and the vapor pressures for liquid mixtures of 125E and propylene at 25° C. are shown in FIG. 3.

The vapor pressure data for the graphs in FIG. 1 are obtained as follows. A stainless steel cylinder is evacuated, and a weighed amount of 125E is added to the cylinder. The cylinder is cooled to reduce the vapor pressure of 125E, and then a weighed amount of cyclopropane is added to the cylinder. The cylinder is agitated to mix the 125E and cyclopropane, and then the cylinder is placed in a constant temperature bath until the temperature comes to equilibrium, at which time the vapor pressure of the 125E and cyclopropane in the cylinder is measured. This procedure is repeated at the same temperature with different weight percents of the components, and the results are plotted in FIG. 1.

Data are obtained in the same way for mixtures of 125E and propylene at 25° C., and the results are plotted in FIG. 3.

The data in FIG. 1 and FIG. 3 show that at 25° C., there are ranges of compositions that have vapor pressures higher than the vapor pressures of the pure components of the composition at that same temperature.

EXAMPLE 6

Figure 2:
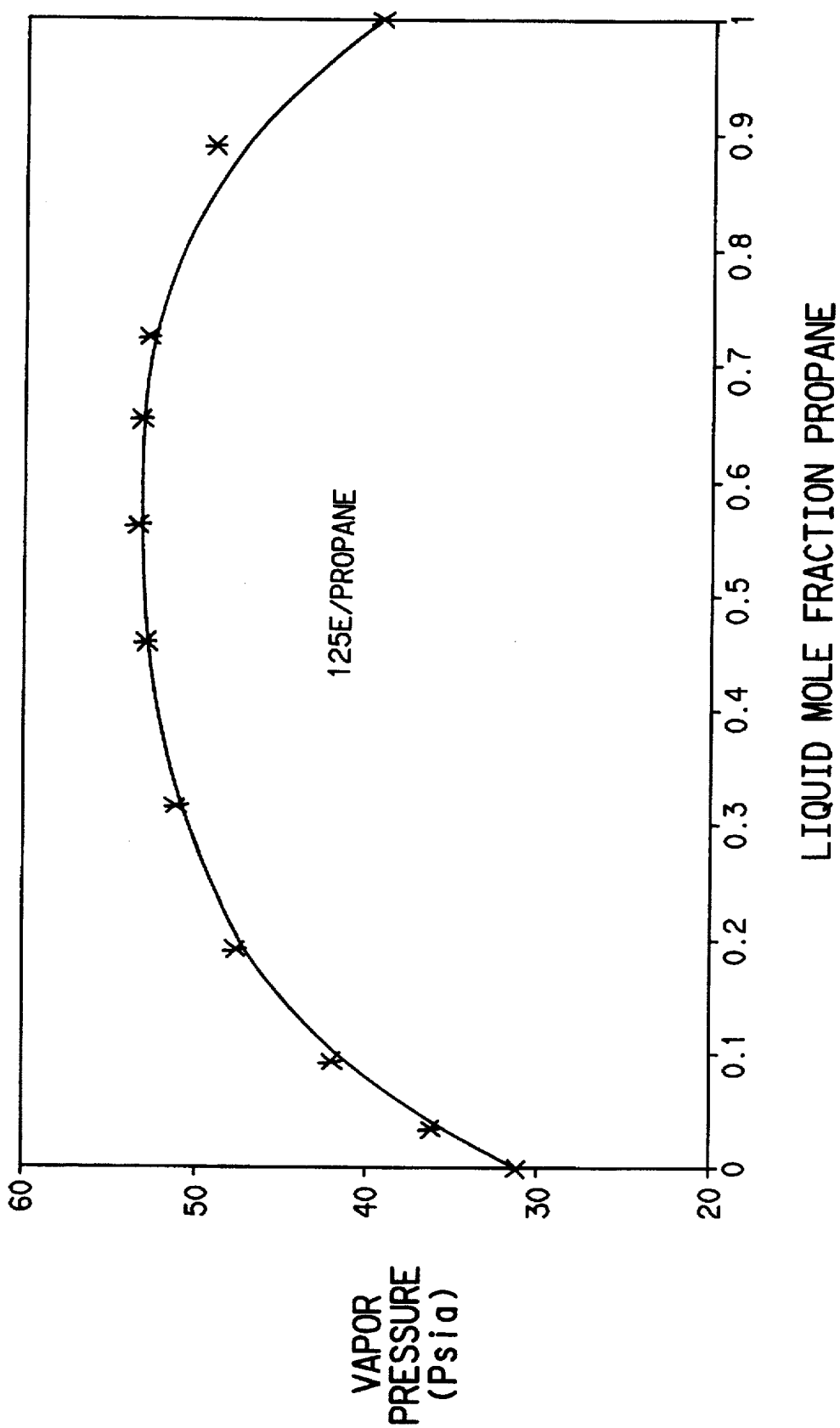
FIG. 2 is a graph of the vapor pressure of liquid mixtures of 125E and propane at −17.8° C.

This Example is directed to the vapor pressure of liquid mixtures of 125E and propane. The vapor pressures measured for mixtures of 125E and propane are shown in FIG. 2, with a best fit curve having been drawn through the individual data points shown in FIG. 2. The procedure for measuring the vapor pressures for mixtures of 125E and propane was as follows. A stainless steel cylinder was evacuated, and a weighed amount of 125E was added to the cylinder. The cylinder was cooled to reduce the vapor pressure of 125E, and then a weighed amount of propane was added to the cylinder. The cylinder was agitated to mix the 125E and propane, and then the cylinder was placed in a constant temperature bath until the temperature came to equilibrium at −17.8° C., at which time the vapor pressure of the content of the cylinder was measured. This procedure was repeated for various mixtures of 125E and propane as indicated in FIG. 2.

The data in FIG. 2 show that at −17.8° C., there are ranges of compositions that have vapor pressures higher than the vapor pressures of the pure components of the composition at that same temperature.

ADDITIONAL COMPOUNDS

Other components, such as aliphatic hydrocarbons having a boiling point of −60° to +60° C., hydrofluorocarbonalkanes having a boiling point of −60° to 60° C., hydrofluoropropanes having a boiling point of between −60° to +60° C., hydrocarbon esters having a boiling point between −60° to +60° C., hydrochlorofluorocarbons having a boiling point between −60° to +60° C., hydrofluorocarbons having a boiling point of −60° to +60° C., hydrochlorocarbons having a boiling point between −60° to +60° C., chlorocarbons and perfluoroinated compounds, can be added to the azeotropic or azeotrope-like compositions described above without substantially changing the properties thereof, including the constant boiling behavior, of the compositions. Examples of such components include the following.

| COMPOUND | FORMULA | Boiling Point, °C. |
|---|---|---|
| HCFC-124 | CHClCF$_3$ | −12° C. |
| FC-600 | CH$_3$CH$_2$CH$_2$CH$_3$ | 0° C. |

Additives such as lubricants, corrosion inhibitors, stabilizers, dyes and other appropriate materials may be added to the novel compositions of the invention for a variety of purposes provides they do not have an adverse influence on the composition for its intended application. Preferred lubricants include esters having a molecular weight greater than 250.

I claim:

1. An azeotropic or azeotrope-like composition consisting essentially of 41–90 weight percent pentafluorodimethyl ether and 10–59 weight percent propane wherein when the temperature has been adjusted to about 25° C., said composition has a vapor pressure of about 183 to 192 psia; or 1–50 weight percent pentafluorodimethyl ether and 50–99 weight percent propylene wherein when the temperature has been adjusted to about 25° C., said composition has a vapor pressure of 166 to 168 psia, and wherein when about 50 weight percent of the composition is evaporated at 25° C., the vapor pressure changes less than about 10 percent.

2. The azeotropic or azeotrope-like composition of claim 1, said composition consisting essentially of 50–90 weight percent pentafluorodimethyl ether and 10–50 weight percent propane; or about 33.8 weight percent pentafluorodimethyl ether and about 66.2 weight percent propylene.

3. A process for producing refrigeration, comprising condensing a composition of claim 1 and thereafter evaporating said composition in the vicinity of the body to be cooled.

4. A process for producing refrigeration, comprising condensing a composition of claim 2 and thereafter evaporating said composition in the vicinity of the body to be cooled.

5. A process for producing heat comprising condensing a composition of claim 1 in the vicinity of a body to be heated, and thereafter evaporating said composition.

6. A process for producing heat comprising condensing a composition of claim 2 in the vicinity of a body to be heated, and thereafter evaporating said composition.

7. A composition consisting essentially of 10 to less than 100 liquid mole percent propane and greater than 0 to about 90 liquid mole percent pentafluorodimethyl ether, wherein the vapor pressure of the composition is higher than the vapor pressure of propane and pentafluorodimethylether at about −17.8° C., when the temperature has been adjusted to about −17.8° C.

8. A composition consisting essentially of 40 to less than 100 liquid weight percent propylene and greater than 0 to about 60 liquid weight percent pentafluorodimethylether, wherein the vapor pressure of the composition is higher than the vapor pressure of propylene and pentafluorodimethylether at about 25° C., when the temperature has been adjusted to about 25° C.

9. A process for producing refrigeration, comprising condensing a composition of claim 7 and thereafter evaporating said composition in the vicinity of the body to be cooled.

10. A process for producing heat comprising condensing a composition of claim 7 in the vicinity of a body to be heated, and thereafter evaporating said composition.

11. A process for producing refrigeration, comprising condensing a composition of claim 8 and thereafter evaporating said composition in the vicinity of the body to be cooled.

12. A process for producing heat comprising condensing a composition of claim 8 in the vicinity of a body to be heated, and thereafter evaporating said composition.

* * * * *